US006436857B1

(12) United States Patent
Brueck et al.

(10) Patent No.: US 6,436,857 B1
(45) Date of Patent: Aug. 20, 2002

(54) LARGE PHOTOSENSITIVITY IN LEAD SILICATE GLASSES

(75) Inventors: Steven R. J. Brueck; Xiangcun Long, both of Albuquerque, NM (US)

(73) Assignee: University of New Mexico, Albuquerque, NM (US)

( * ) Notice: Subject to any disclaimer, the term of this patent is extended or adjusted under 35 U.S.C. 154(b) by 0 days.

(21) Appl. No.: 09/545,505

(22) Filed: Apr. 7, 2000

Related U.S. Application Data

(60) Provisional application No. 60/130,268, filed on Apr. 21, 1999, and provisional application No. 60/128,622, filed on Apr. 9, 1999.

(51) Int. Cl.⁷ .......................... C03C 3/07; C03C 3/102; C03C 13/04
(52) U.S. Cl. .......................... 501/37; 501/60; 501/74; 385/37; 385/124
(58) Field of Search .............................. 501/37, 60, 61, 501/62, 74, 75, 76; 385/37, 124

(56) References Cited

U.S. PATENT DOCUMENTS

| 3,354,064 | A | 11/1967 | Letter et al. |
| 4,001,095 | A | 1/1977 | Nakatani |
| 4,788,436 | A | 11/1988 | Koechner |
| 5,133,791 | A | 7/1992 | Yagami et al. |
| 5,475,528 | A | 12/1995 | LaBorde |
| 5,500,031 | A | 3/1996 | Atkins et al. |
| 5,721,802 | A | 2/1998 | Francis et al. |
| 5,966,233 | A | 10/1999 | Fujiwara et al. |
| 6,284,685 | B1 * | 9/2001 | Borrelli et al. ............... 501/45 |

OTHER PUBLICATIONS

Long et al., "Large photosensitity in lead–silicate glasses," Applied Physics Letters, vol. 74, No. 15, Apr. 12, 1999.

Long et al., "Composition dependence of the photoinduced refractive–index change in lead silicate glasses," Optics Letters, vol. 24, No. 16, Aug. 15, 1999.

* cited by examiner

*Primary Examiner*—Karl Group
(74) *Attorney, Agent, or Firm*—Jagtiani & Guttag

(57) ABSTRACT

The present invention provides a method for inducing a refractive index change in a lead silicate glass material comprising: providing a lead silicate glass material; and irradiating the lead silicate glass material to increase the index of refraction of said lead silicate glass material. The present invention also provides a photo-induced lead silicate glass grating.

16 Claims, 6 Drawing Sheets

LARGE PHOTOSENSITIVITY IN LEAD SILICATE GLASSES

CROSS-REFERENCE TO RELATED APPLICATIONS

This application makes reference to co-pending U.S. Provisional Patent Application No. 60/128,622, entitled "Large Photosensitivity in Lead silicate Glasses," filed Apr. 9, 1999; and co-pending U.S. Provisional Patent Application No. 60/130,268, entitled "Large Photosensitivity in Lead silicate Glasses," filed Apr. 21, 1999, the entire disclosure and contents of which are hereby incorporated by reference.

GOVERNMENT INTEREST STATEMENT

This invention is made with government support by the Air Force Office of Scientific Research and by the Defense Advanced Research Projects Agency. The government may have certain rights in this invention.

BACKGROUND OF THE INVENTION

1. Field of the Invention

The present invention relates to lead silicate glasses.

2. Description of the Prior Art

Photosensitivity, the long-term change of glass refractive index following optical irradiation, has found application in telecommunications see A. Othonos, *Rev. Sci. Instrum.* 68, 4309 (1997), and data storage, see A. Partovi, T. Erdogan, V. Mizrahi, P. J. Lemaire, A. M. Glass and J. W. Fleming, *Appl Phys. Lett.* 64, 821 (1994). The preponderance of the investigations in optical fiber have been devoted to germanosilicate glasses with Δn, the index difference between irradiated and non-irradiated material, saturating at about 0.01 for hydrogen loaded fibers with limited stability at elevated temperatures, see A. Othonos, *Rev. Sci. Instrum.* 68, 4309 (1997). For data storage, crystalline phase change materials have been explored because of the large index changes available. However, these materials are not useful for fiber applications. Therefore, there exists a need for glasses with higher photosensitivity for improved performance in both fiber and volume storage applications.

SUMMARY OF THE INVENTION

It is therefore an object of the present invention to provide a method for forming lead silicate glass materials having large, thermally stable photosensitivities.

It is another object of the present invention to provide a method for forming lead silicate glass materials that may be for used in telecommunications, integrated optics and data storage technologies.

It is yet another object of the present invention to provide a method for forming glasses with higher photosensitivity for improved performance in both fiber and volume storage applications.

According to a first broad aspect of the present invention, there is provided a method for inducing a refractive index change in a lead silicate glass material comprising: providing a lead silicate glass material; and irradiating the lead silicate glass material to increase the index of refraction of said lead silicate glass material.

According to a second broad aspect of the present invention, there is provided a photo-induced lead silicate glass grating.

Other objects and features of the present invention will be apparent from the following detailed description of the preferred embodiment.

BRIEF DESCRIPTION OF THE DRAWINGS

The invention will be described in conjunction with the accompanying drawings, in which.

DETAILED DESCRIPTION OF THE PREFERRED EMBODIMENT

Figure 1:
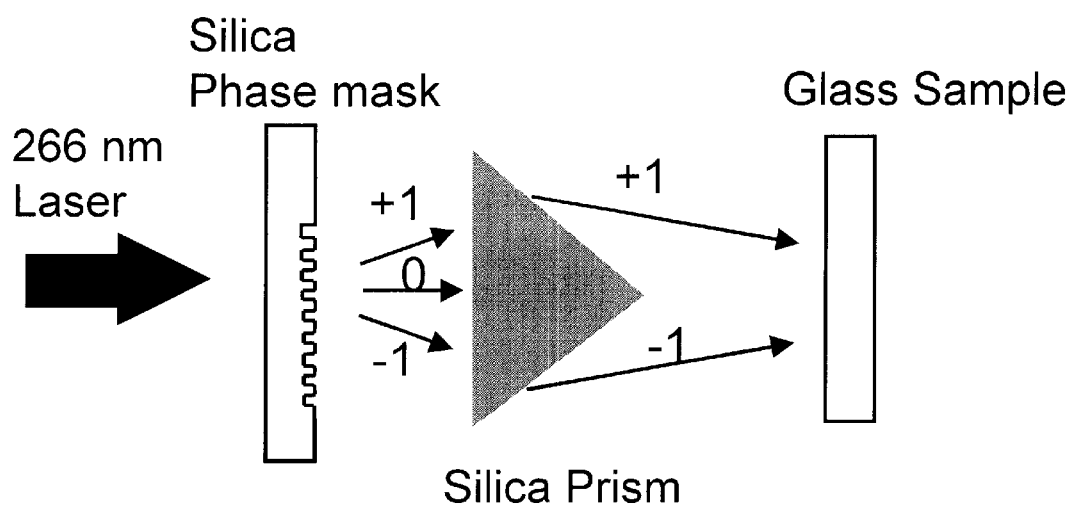
FIG. 1 illustrates an experimental arrangement for writing gratings in lead silicate glasses.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "lead silicate glass" refers to any silicate glass including any amount of PbO.

For the purposes of the present invention the term "lead silicate glass grating" refers to a lead silicate glass having the properties of a Bragg grating. Such a grating may be formed on a bulk silicate glass, formed in a fiber, waveguide, etc.

For the purposes of the present invention the term "photo-induced lead silicate glass grating" refers to a lead silicate glass grating formed by irradiating a lead silicate glass with any form of electromagnetic radiation.

Description

Lead silicate glass has a very large third-order optical nonlinearity. The third-order nonlinear refractive index for Schott lead silicate glass SF59 is $n_2 = 5 \times 10^{-19}$ m$^2$/W, [$\chi^{(3)} = 6.2 \times 10^{-21}$ m$^2$/V$^2$] which is 30 times that of pure silica glass [$\chi^{(3)} = 2.0 \times 10^{-22}$ m$^2$/V$^2$], see E. M. Vogel, M. J. Weber and D. M. Krol, *Phys. & Chem. Glasses*, 32, 231 (1991). Recently a large second-order optical non linearity ($\chi^{(2)} \approx 7$ pm/V) induced by thermal poling and electron beam scanning was reported in these materials, see M. Qiu, F. Pi and G. Orriols, *Appl. Phys. Lett.*, 73, 3040 (1998); and M. Qiu, T. Mizunarni, H. Koya, F. Pi, and G. Orriols, in *Proceedings of Nonlinear Optics: Materials, Fundamentals, and Applications* (IEEE, Piscataway, N. 1998), p. 370. The present invention takes advantage of the fact that these large nonlinearities appear to be related to the Photosensitivity of lead silicate glasses.

In the present invention a large photo-induced refractive index change (as high as Δn=0.21±0.04) is obtained in lead silicate glasses by irradiation with the frequency quadrupled output of a Q-switched YAG laser (266 nm). An approximately exponential relationship exists between the photo-induced refractive index change and the lead cation mole fraction over the composition range from 18.7% to 57%. The induced refractive index change is permanent and shows no decay after heating up to 360° C. over one hour. Dispersion of the refractive index change suggests that the photosensitivity is associated with changes in the intrinsic glass absorption edge.

A similarly large photo-induced refractive index change (as high as $\Delta n_0$=0.09±0.02) in permanent gratings formed in lead silicate glass with a UV exposure at 248 nm using a KrF excimer laser beam.

Although in the examples described below only two wavelength lengths of light are used to irradiate lead silicate glasses, the present invention encompasses using many other wavelength of electromagnetic energy to irradiate lead silicate glasses. Also, the present invention encompasses various irradiation sources in addition to the Q-switched YAG laser and the KrF excimer laser described below.

Furthermore, although the irradiation of only a few lead silicate glass compositions, ranging from the range from 19- to 70- mol. % are described below, the present invention encompasses irradiating virtually any lead silicate glass composition.

The large photosensitivity of the lead silicate glasses formed by the method of the present invention may find application in telecommunications, see A. Othonos, *Rev. Sci. Instrum.* 68, 4309 (1997), and data storage, see A. Partovi, T. Erdogan, V. Mizrahi, P. J. Lemaire, A. M. Glass and J. W. Fleming, *Appl. Phys. Lett.* 64, 821 (1994). For fiber grating application, a few mol. % PbO can be doped into glasses to enhance the photosensitivity of silica glass fibers. Currently, a hydrogen-loading technology is used to enhance the photosensitivity in germanosilicate fibers. The index difference, Δn, between irradiated and non-irradiated material saturates at about 0.01 for hydrogen-loaded fibers with limited stability at elevated temperatures. For some fiber applications, such as fiber filters and fiber dispersion compensators, see N. M. Litchinitser, B. J. Eggleton and D. B. Patterson, *J Lightwave Technol.*, 15, 1303 (1997), a stronger photosensitivity would be desirable. For volume optical holographic data storage, inexpensive materials with high optical quality, high photosensitivity, large refractive index change, long shelf life are still necessary. Also, a large photosensitivity in silica-based glass would make it possible to fabricate planar lightwave circuits (PLC) devices by direct UV-writing.

The present invention will now be described by way of example.

EXAMPLE 1

A detailed investigation of the dependence of the photo-induced refractive index change on composition for lead silicate glasses was conducted. The heavy metal cation lead contributes to the large photosensitivity. An exponential relationship was found between the photo-induced refractive index change and lead concentration over the range from 19- to 57- mol. %. The largest index change (Δn=0.21±0.02 at 633 nm) was obtained in SF59 glass by irradiation with a 266-nm laser source at a fluence of 25 $mJ/cm_2$ per pulse (10 ns, 10 Hz, 10 min) and a total dose of 150 $J/cm^2$. The induced refractive index change is permanent and does not exhibit any decay after heating to 360° C. for over an hour. The dispersion of the photo-induced index is consistent with a change in the absorption near the fundamental absorption edge of the glass. Extrapolating to telecommunications wavelengths, the index change is Δn~0.16.

Lead silicate glasses ZF7 and the Schott glass series F2, SF2, SF11, SF6, and SF59 were chosen to study the dependence of photo-induced refractive index change on the lead composition. The lead-oxide content varied from 18.7 mol. % to 57 mol. %. The detailed materials compositions of the glasses are listed in Table 1 below:

TABLE 1

| Composition of lead silicate glasses (mol. % and (wt. %)) | | | | | | | |
|---|---|---|---|---|---|---|---|
| Sample | PbO | $SiO_2$ | $Na_2O$ | $K_2O$ | $Al_2O_3$ | $TiO_2$ | $As_2O_3$ |
| F2 | 18.7 (45.1) | 70.7 (45.7) | 5.4 (3.6) | 4.9 (5.0) | — | — | 0.3 |
| SF2 | 22.9 (50.8) | 68.5 (40.9) | 0.8 (0.5) | 7.3 (6.8) | — | — | 0.5 (1) |
| SF11 | 33.2 (63.3) | 56.9 (29.2) | 0.9 (0.5) | — | 2.9 (2.5) | 5.8 (4.0) | 0.3 (0.5) |
| ZF7 | 40 (70.9) | 57.2 (27.3) | 1.2 (0.6) | 1.3 (1.0) | — | — | 0.2 (0.3) |
| SF6 | 40.4 (71.3) | 56.7 (26.9) | 2.0 (1.0) | — | 0.6 (0.5) | — | 0.2 (0.3) |
| SF59 | 57 (83) | 40 (17) | — | — | — | — | — |

The optical absorption edge varied with the lead content of the glasses. The optical band gap is 2.71 eV for 80 mol. % PbO glass increasing to 3.38 eV for 50 mol. % PbO silicate glass, see A. Barbulescu and Lucia Sincan, Phys. Stat. Sol. (a) 85, K129 (1984).

FIG. 1 illustrates the experimental arrangement used for writing gratings in lead silicate glasses. The source is a 266-nm, fourth harmonic Q-Switched YAG laser. The silica phase mask with period of 738 nm is designed for 248-nm. The silica prism is used to completely reject the zero-order transmitted light as well as to separate the glass samples from the phase mask.

Figure 2:
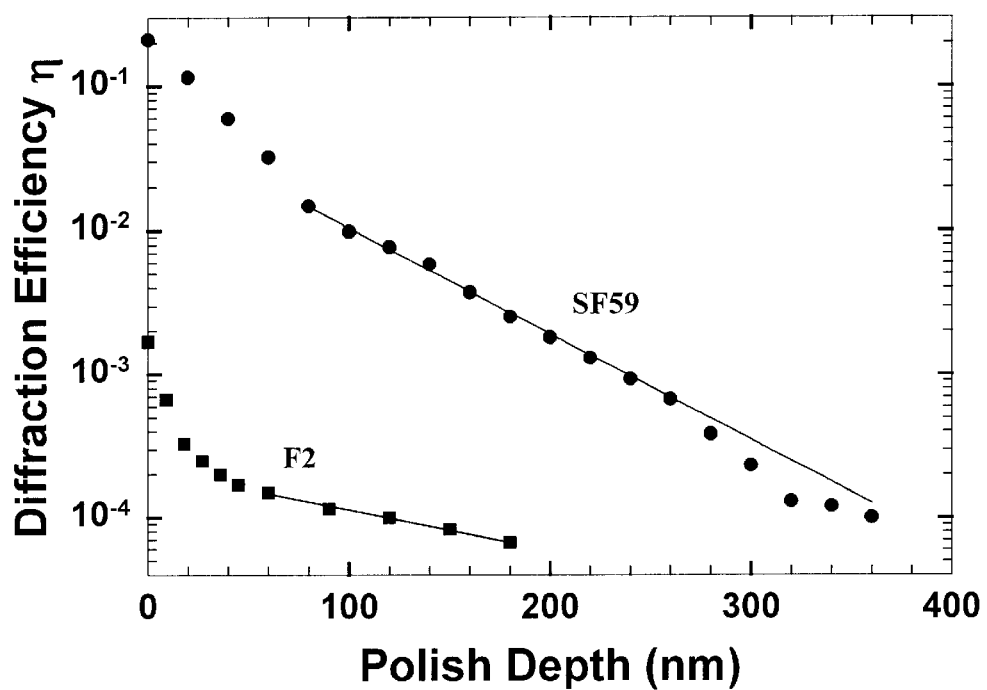
FIG. 2 illustrates a depth profile of the diffraction efficiency for UV-laser induced grating on lead silicate glasses SF59 and (F2)

FIG. 2 illustrates a depth profile of the diffraction efficiency for UV-laser induced grating on the lead silicate glasses SF59 and (F2). The diffraction efficiency drops sharply as the surface relief grating with ~100 nm (20 nm) depth is removed. The measured (circles) and modeled, see Equation 1 below, diffraction efficiency (line) indicate peak refractive index modulations of Δn=0.21±0.04 (0.007±0.002) with an exponential decay length of 118 nm (303 nm) resulting from the strong absorption at the 266-nm writing wavelength.

Figure 3:
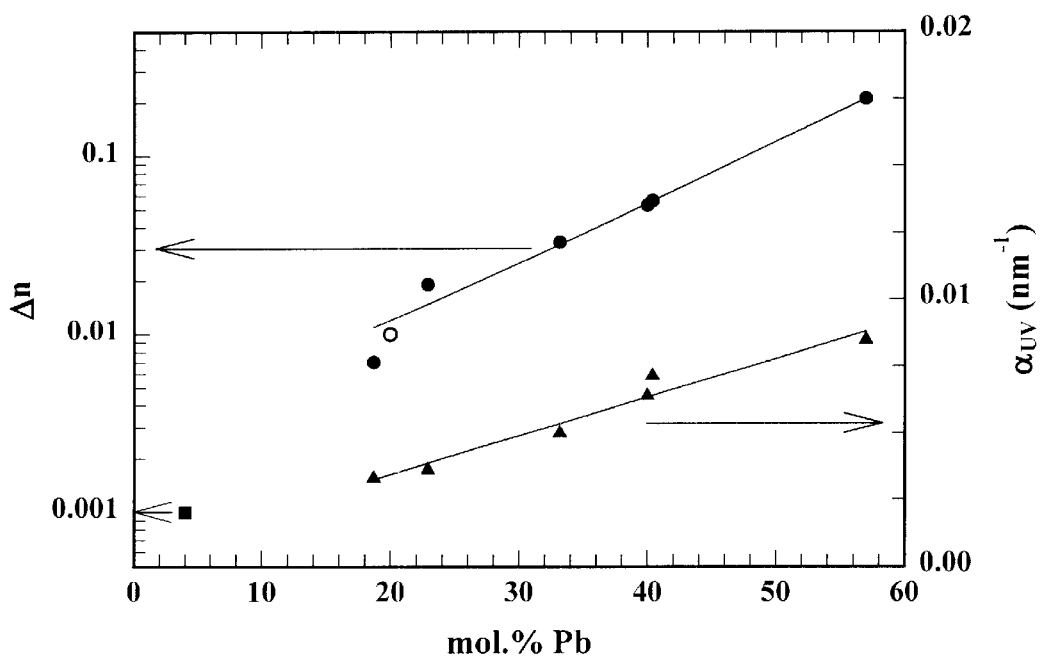
FIG. 3 illustrates the photo-induced refractive index changes vs. heavy metal lead cation in mol. % (solid circles) and exponential fit (solid line)

FIG. 3 illustrates the photo-induced refractive index changes vs. heavy metal lead cation in mol. % (solid circles) and exponential fit (solid line). The data point denoted by "#" is from S. Mailis, A. A. Anderson, S. J. Barrington, W. S. Brocklesby, R. Greef, H. N. Rutt, R. W. Eason, N. A. Vainos and C. Grivas, *Opt. Lett.* 23, 1751 (1998) for glass $55GeO_2$-20PbO-10ZnO-$5K_2O$ (in mol. %) and "■" from S.

Radic, R. J. Essiambre, R. Boyd, P. A. Tick and N. Borrelli, *Opt. Lett.* 23, 1730 (1998).for glass $47SnF_2$-$47PO_{2.5}$-$4PbO$-$2SnCl_2$ (in mol. %).

Figure 4:
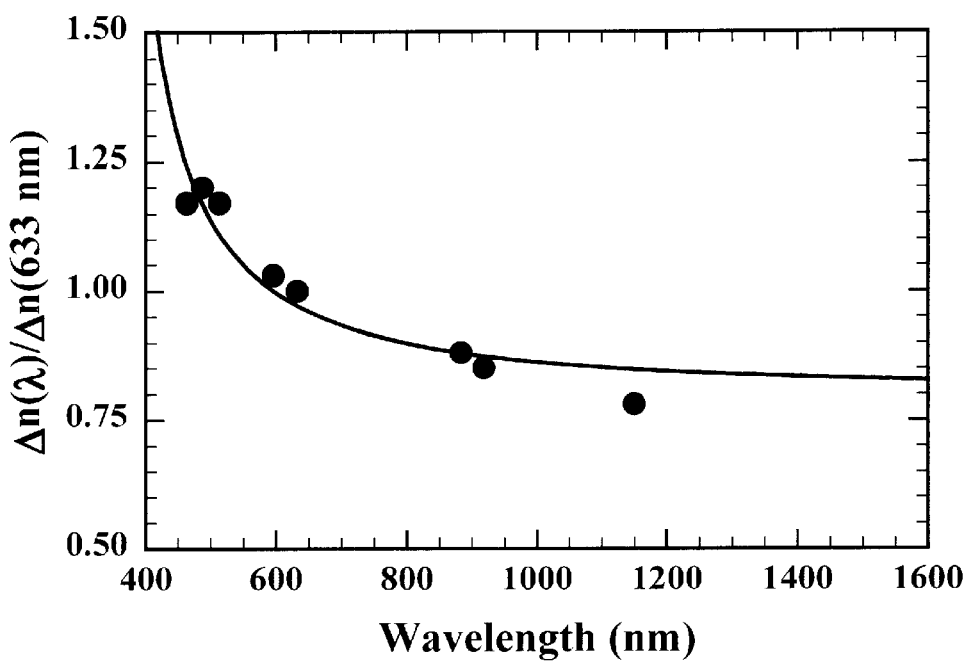
FIG. 4 illustrates the dispersion of Δn for lead silicate glass SF59.

FIG. 4 illustrates the dispersion of $\Delta n$ for lead silicate glass SF59. The index change values were normalized to the value at 633 nm. The solid line is a fit to a simple Sellmeier dependence with a characteristic wavelength of 353 nm.

The irradiation source was the frequency-quadrupled output of a Q-Switched YAG laser (~10 ns,10-Hz repetition rate) at 266 nm. A silica phase mask (738-nm period), optimized for 248-nm excimer laser was used. A strong zero-order beam was observed for 266-nm illumination. The zero-order light was eliminated with a 45° silica prism, see FIG. 1, which also changed the incident angles to 5.7° giving a ~1.3-$\mu$m period grating. Another advantage of using this arrangement was that the glass samples were kept far from any optical surfaces eliminating any potential contamination due to glass photo-ablation. The high spatial and temporal coherence of the YAG laser is essential in this configuration. The laser energy was ~6-mJ/pulse over an area of 0.4×0.6 $cm^2$ giving an incident energy density of 25 $mJ/cm^2$ per pulse.

All of the polished glass samples were irradiated under the same conditions for this composition comparison study, i.e. 25 $mJ/cm^2$ per pulse fluence for 10 min. with 10-Hz repetition rate. A He-Ne laser beam was used to measure the diffraction efficiency of the grating following irradiation. Both surface relief and refractive index gratings were observed for all of the glasses studied. The highest diffraction efficiency (20%) was obtained for the highest lead content (SF59-57 mol. %) glass. This high diffraction efficiency arises primarily from the ~100-nm deep surface relief grating. In contrast, only a weak diffraction signal was observed for F2 glass which has lowest lead content (18.7 mol. %). To extract the photo-induced refractive index change, we incrementally polished away both the surface relief grating and the underlying index grating and monitored the diffraction efficiency $\eta$ after each polish step. The details of the technique are described in our previous report. As an example, the diffraction efficiency $\eta$ vs. polish depth for glass SF59 and glass F2 were shown in FIG. 2. For SF59, the photo-induced grating provided a relatively high diffraction efficiency ($\eta$~1%) once the ~100-nm surface relief grating was removed. For F2, a very shallow surface relief grating with height of 20 nm diffracted only ~0.2% of the incident light. It is assumed that the modulation of the refractive index decreases exponentially with depth (attenuation coefficient $\alpha_{uv}$) because of the UV-absorption of the glass, that is $\Delta n(z)=\Delta n e^{-\alpha_{uv} z}$, where $\Delta n$ is the index modulation at the surface of sample. Following a previously developed theory, see N. Uchida, *J Opt. Soc. Am.* 63, 280 (1973)., the refractive index change $\Delta n$ can be evaluated using the diffraction efficiency formula for a vertical, unslanted grating with s-polarized incident light:

$$\eta = \left(\frac{\pi \Delta n}{\lambda \alpha_{UV} \cos\theta}\right)^2 e^{-2\alpha_{UV} h} \quad (1)$$

where $\eta$ is the diffraction efficiency, h is the cumulative polish depth, $\lambda$ the wavelength of the diffracted light, and $\theta$ the incident angle in the medium. Using Equation 1 to fit the measured data, we found the photo-induced index changes $\Delta n$ are 0.21 and 0.007 for glasses SF59 and F2, respectively. The photo-induced index changes $\Delta n$ and absorption $\alpha_{uv}$ obtained for all of the measured glasses are listed in Table 2 below:

TABLE 2

Fitting parameters for the photosensitive index grating parameters $\Delta n$ and $\alpha_{UV}$ for various lead silicate glasses

|  | SF59 | ZF7 | SF6 | SF11 | SF2 | F2 |
| --- | --- | --- | --- | --- | --- | --- |
| $\Delta n$ | 0.21 | 0.056 | 0.053 | 0.033 | 0.019 | 0.007 |
| $1/\alpha_{UV}$ (nm) | 118 | 140 | 157 | 200 | 277 | 303 |

The photo-induced refractive index change $\Delta n$ and the UV absorption length $\alpha_{uv}$ are plotted in FIG. 3 against the lead cation mol. %. The photo-induced index change refers to the lefthand (logarithmic) scale, the absorption length is on the righthand (linear) scale. Both parameters are well correlated to the mol. % PbO. The index change is exponential in Pb content, the absorption length is linear in Pb content. Two recent reports of photosensitivity in PbO related glasses are also plotted in FIG. 3. One reported that photo-induced refractive index change, $\Delta n$ as high as 0.01, was obtained for the $55GeO_2$-$20PbO$-$10ZnO$-$5K_2O$ (in mol. %) glass film system deposited by excimer laser ablation, see S. Mailis, A. A. Anderson, S. J. Barrington, W. S. Brocklesby, R. Greef, H. N. Rutt, R. W. Eason, N. A. Vainos and C. Grivas, Opt. Lett. 23, 1751 (1998). This photo-induced refractive index change $\Delta n$ vs. lead mol. % fits well with our data as shown in FIG. 3 by the "#" symbol. The other reported saturated photo-induced refractive index change $\Delta n$ ~0.001 is obtained after irradiation with a pulsed XeCl excimer laser (309 nm) in $47SnF_2$-$47PO_{2.5}$-$4PbO$-$2SnCl_2$(in mol. %), see S. Radic, R. J. Essiambre, R. Boyd, P. A. Tick and N. Borrelli, Opt. Lett. 23, 1730 (1998). The sample was capped by $SiO_2$ plates during exposure to eliminate formation of a surface relief grating. This data point is lower than would be obtained by extrapolating the Pb concentration dependence we observe (symbol "■" in FIG. 3). For very high lead mol. % compositions, the photo-induced refractive index change must saturate. An exponential dependence of the third-order nonlinear susceptibility $\chi^{(3)}$ on Pb mole fraction has been reported previously, see E. M. Vogel, M. J. Weber and D. M. *Krol. Phys. Chem. Glasses*32, 231 (1991).

Several lasers with various wavelengths were used to measure the dispersion of the photo-induced refractive index change $\Delta n$ in SF59 glass. The laser wavelengths were 488 nm and 514 nm from $Ar^+$ laser, 596.3 nm, 632.8 nm and 1150 nm from He—Ne lasers, 883.5 nm and 918.3 nm from a tunable Ti:Sapphire laser. The refractive index changes at various wavelengths normalized to that at 633 nm are shown in FIG. 4. The solid curve in the figure is a fit to a simple Sellmeier curve:

$$\Delta n \sim \lambda \Big/ \sqrt{\lambda^2 - \lambda_0^2}$$

with $\lambda_0$~353 nm close to the band-edge value of ~370 nm, suggesting that the photosensitivity is associated with local modifications to the glass structure rather than with impurity levels. At telecommunications wavelengths of 1.3 and 1.55 $\mu$m, the $\Delta n$ is ~0.8 of that at 633 nm with very little dispersion since these wavelengths are far removed from the absorption band-edge of the glass.

Finally the thermal stability of the photo-induced index change was examined. The photo-induced diffraction gratings, after polishing away the surface relief structures, were heated to temperatures of 100°-, 200°-, 250°-, and 360° C. for 1-hour intervals. After each heat treatment the grating diffraction efficiency was measured at room temperature. No decay of the diffraction efficiency was observed even at 360° C.

In summary, the photo-induced refractive index change in lead silicate glass is strongly correlated with the PbO composition. There is an exponential relationship between the photo-induced refractive index change and the lead concentration in mol. % PbO over the range from 18.7- to 57-mol. %. A large index change as high as 0.21 at 633 nm extrapolated to 0.17 at 1550 nm is observed in SF59 glass. The dispersion is consistent with a modification to the glass structure. The index change is permanent and shows no decay when the glass heated to temperatures as high as 360° C. for one hour. These large, thermally stable photosensitivities are attractive for applications in telecommunications, integrated optics and data storage.

EXAMPLE 2

Strong, permanent surface-relief and refractive index gratings were written in lead silicate glasses by irradiation with the output of a pulsed KrF excimer laser (248 nm) through a phase mask. Diffraction efficiencies as high as 10% were obtained. The diffraction efficiency of the refractive index grating after removal of the surface-relief grating showed that a very large photo-induced refractive index change ($\Delta n_0$=0.21±0.04) was obtained in ZF7 lead silicate glass (40 mol. % PbO).

Figure 5A:
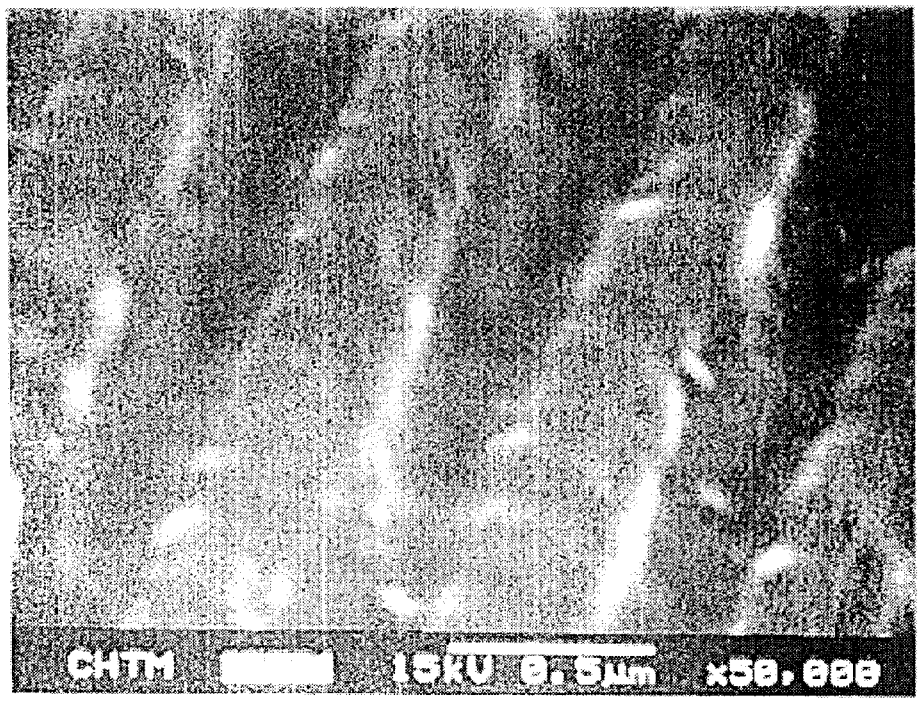
FIG. 5A is a scanning electron micrograph of surface relief patterns in a first portion of ZF7 sample after 248-nm irradiation through a 738-nm phase mask with a period of 738 nm.
Figure 5B:
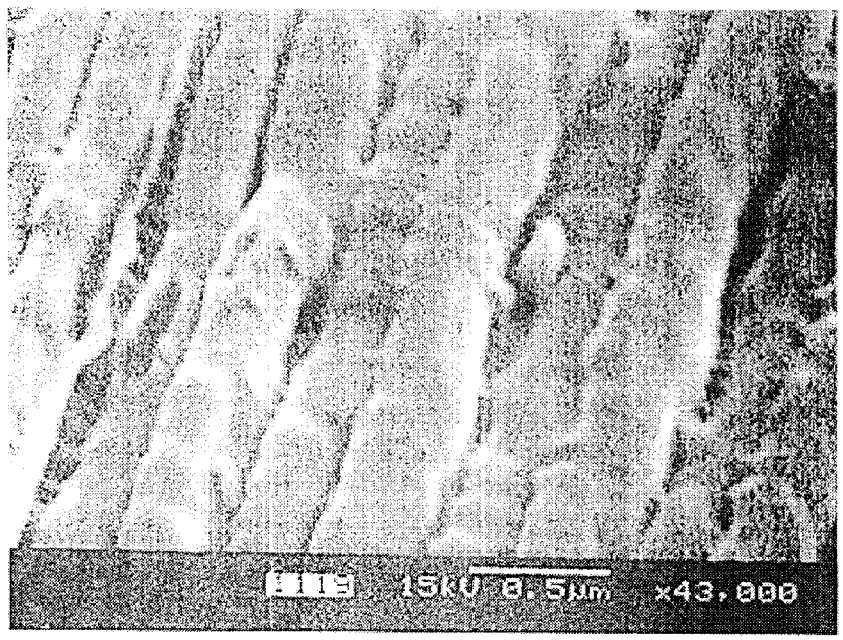
FIG. 5B is a scanning electron micrograph of surface relief patterns in a second portion of ZF7 sample of FIG. 5A after 248-nm irradiation through a 738-nm phase mask with a double period of 369 nm.

FIG. 5A is a scanning electron micrograph of surface relief patterns in a first portion of ZF7 sample after 248-nm irradiation through a 738-nm phase mask with a period of 738 rm. FIG. 5B is a scanning electron micrograph of surface relief patterns in a second portion of ZF7 sample of FIG. 5A after 248-nm irradiation through a 738-nm phase mask with a double period of 369 nm.

Figure 6:
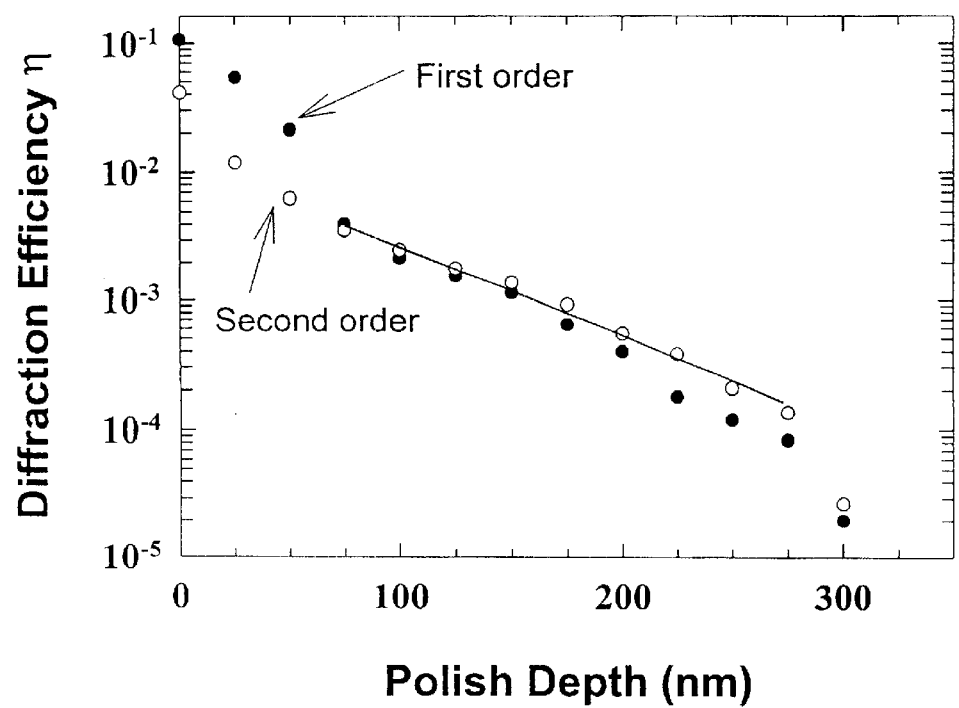
FIG. 6 is a depth profile of the diffraction efficiency for UV laser induced grating on lead silicate glass.

FIG. 6 is a depth profile of the diffraction efficiency for UV laser induced grating on lead silicate glass. The diffraction efficiency drops sharply as the surface relief grating with ~70 nm height is removed. The measured (solid circles for first order and open circles for second order) and modeled, see Equation 1, diffraction efficiency indicate a peak refractive index modulation $\Delta n_0$=0.09±0.02 with an exponential decay length of 125 nm resulting form the strong absorption at the 248-nm writing wavelength.

Various lead-content silicate glasses were investigated with lead compositions varying from 40% to 71%. ZF7 lead silicate glass (PbO—70.93 wt %, $SiO_2$—27.27 wt %, $Na_2O$—0.6 wt %, $K_2O$—1.0 wt %, $As_2O_3$—0.3 wt %) had the highest percentage lead content of the compositions investigated. The optical transmission is similar to the SF glass series from Schott Glass Co., with a UV-cutoff around 350 nm. All of the lead glasses investigated: F2, SF11, SF6, and ZF7 are photosensitive at 248 nm. A detailed study is presented below for only ZF7 glass. This glass is photosensitive across a wide spectral region range including 193 nm (ArF laser), 248 nm (KrF laser), 266 nm (4th harmonic of Q-switched YAG laser). No photosensitivity was observed for irradiation at 355 nm ($3^{rd}$ harmonic of Q-switched YAG laser), very close to the optical absorption edge.

The same silica phase mask (period 738 nm) was used for grating formation at all wavelengths, resulting in varying contrast between the fundamental and second-spatial harmonic grating exposures. For normal incidence KrF laser illumination, the measure phase mask power transmission was 12.5% for the zero order, 37.5% for the ±1 orders and 6.25% for the ±2 orders. The glass sample was placed in physical contact with the surface of the silica phase mask. The incident pulse energy density was 132 $mJ/cm^2$ per pulse with a repetition of 10 Hz.

After a few minutes of UV laser irradiation, a strong grating was observed in the glass sample. The strength of the grating, monitored by first-order diffraction of a HeNe laser beam initially increased with exposure time and saturated for exposure times of ~10 min. FIGS. 5A and 5B are scanning electron micrographs (SEMs) showing the induced surface relief grating on the lead silicate glass after 10 min. of irradiation. In FIG. 5A, a grating with a period d=738 nm is clearly seen. In FIG. 5B, corresponding to a different location on the same grating, the frequency-doubled period d/2 is evident. This differs from observations of grating formation in $As_2S_3$ glass where the grating is mainly due to photoexpansion and the response drops off dramatically for short period gratings, see S. Ramachandran, S. G. Bishop, G. P. Guo, and D. J. Brady, *IEEE Photon. Tech. Lett.* 8, 1041 (1996). Atomic force microscope (AFM) images of the ZF& surface show similar results. The height of the surface relief grating is approximately 70 n. The inhomogeneity of the grating is likely due to optical effects related to the finite spatial and temporal coherence of the KrF laser source, see P. E. Dyer, R. J. Farley, R. Giedl, *Opt. Commun.*, 115, 327, (1995), coupled with the multiple scattered orders from the phase-mask and the varying contact distances.

A HeNe laser beam was used to measure the diffraction efficiency of the grating. Diffraction is observed at angles corresponding to the fundamental grating (probing only the variation at period d) and at the second-order angle (involving interference between the second-order diffraction from the period d grating and the first-order diffraction from the period d/2 grating). The diffraction efficiencies were 10.8% (first-order angle) and 4.1% (second-order angle) for an s-polarized HeNe beam at an incident angle (external) of $\theta_{ext}$=60°. For the measured 70-nm height, h, of the surface relief grating and the refractive index difference between the glass and air $\Delta n$=0.8, the diffraction efficiency, $\eta$, may calculated using the following formula:

$$\eta = \left(\frac{\pi h \Delta n}{\lambda \cos\theta}\right)^2$$

The diffraction efficiency calculated, $\eta$=10.03% was very close to the measured value of 10.8%, suggesting that the surface relief grating is responsible for the majority of the diffracted signal. To confirm this hypothesis, a drop of index matching fluid (n ~1.8) was placed atop the grating and another ZF7 glass plate was pressed to grating surface; the diffraction efficiency was reduced to ~08%.

The grating surface was then polished in steps to remove the surface relief grating and observe the diffracted light from the induced index grating. An additional surface-relief grating with a large 100-$\mu$m period and 1900-nm depth was made in the neighborhood of the photo-induced grating by standard lithography and etching. The depth of the physical grating was measured with a stylus profilometer before any polishing and after the final polishing step. A linear dependence of the polish depth vs. polish time was assumed giving a polish depth of ~25 nm for each step. The diffraction efficiencies of the grating were monitored after each polish step as shown in FIG. 6 for the same grating shown in FIGS. 5A and 5B. The diffraction efficiency drops sharply from 10.8% down to 0.4% as the top 75-nm surface layer is polished away, corresponding to the removal of the surface-relief grating. The efficiency of both first-order and second-order diffraction signals are comparable over the depth range from 75 nm to 300 nm, suggesting that gratings with periods of both d and d/2 were induced with comparable intensities.

It is assumed that the modulation of the refractive index decreases exponentially with depth (attenuation coefficient $\alpha_{uv}$), because of the UV-absorption of the glass, that is $$\Delta n(z) = \Delta n_0 e^{-\alpha_{uv} z}$$

where $\Delta n_0$ is the index modulation at the surface of the sample. Following a previously developed theory, see N. Uchida, *J. Opt. Soc. Am.*, 63, 280 (1973, the refractive index change may be evaluated $\Delta n_0$ can be evaluated using Equation 1 above.

Using Equation 1 to fit the data in FIG. 6 the following results are obtained: $\Delta n_0 = 0.09 \pm 0.02$ and $\alpha_{uv} = 1/125$ nm$^{-1}$. The shallowness of the induced grating is mainly caused by the large ZF7 absorption coefficient at the 248-nm KrF excimer laser wavelength. If we use a source with wavelength between 300 and 350 nm to write a grating in the lead silicate glass, a much larger penetration length should be obtained since a lower absorption coefficient is expected for these wavelengths. Diffraction efficiency as high as 90% may be obtained if the thickness is a uniform index grating could be extended 4.2 μm for the same refractive index change of $\Delta n_0 = 0.09$.

This large photo-induced index change may be due to color centers in lead silicate glass. It has been reported, see K. W. Delong, V. Mizrahi, G. I. Stegeman, M. A. Saifi, and M. J. Andrejco, *J. Opt. Soc. Am.*, B7, 2210 (1990), that color centers were formed in a lead silicate glass through two-photon absorption of a pulsed doubled-YAG laser (532 nm). No photosensitivity was observed in these bulk glasses for irradiation at 532-nm at intensities up to the threshold for surface damage.

In summary, a high diffraction efficiency grating (10%) was induced in lead silicate glass by irradiation with a pulsed, 248-nm KrF excimer laser through a silica phase mask. The primary scattering mechanism was surface relief. By monitoring the diffraction efficiency as the surface was polished down, a photo-induced refractive index change Δn as high as 0.09 extending ~125 nm into the glass was deduced.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. An irradiated lead silicate glass material made by a method comprising:
   providing a lead silicate glass material; and
   irradiating said lead silicate glass material to increase the index of refraction of said lead silicate glass material.

2. A lead silicate glass comprising a photo-induced grating.

3. The lead silicate glass of claim 2, wherein said lead silicate glass comprises about 40 mol. % to about 70 mol. % PbO.

4. The lead silicate glass of claim 2, wherein said photo-induced grating has an efficiency of at least 10%.

5. The lead silicate glass of claim 2, wherein said photo-induced grating comprises a grating in a fiber.

6. The lead silicate glass of claim 2, wherein said photo-induced grating comprises a grating in a waveguide.

7. The material of claim 1, wherein said method further comprises doping a silicate glass material with PbO to form said lead silicate glass material.

8. The material of claim 1, wherein said irradiated lead silicate glass material comprises about 19 mol. % to about 70 mol. % PbO.

9. The material of claim 1, wherein said irradiated lead silicate glass material comprises about 19 mol. % to about 57 mol. % PbO.

10. The material of claim 1, wherein said irradiated lead silicate glass material comprises about 40 mol. % to about 70 mol. % PbO.

11. The material of claim 1, wherein said irradiated lead silicate glass material is irradiated by a 266-nm laser source.

12. The material of claim 11, wherein said 266-nm laser source has a fluence of 25 mJ/cm$^2$ per pulse.

13. The material of claim 11, wherein said irradiated lead silicate glass material is irradiated with a total dose of 150 J/cm$^2$.

14. The material of claim 1, wherein said irradiated lead silicate glass material is irradiated by a 248-nm laser source.

15. The material of claim 1, wherein said irradiated lead silicate glass material comprises a lead silicate fiber.

16. The material of claim 1, wherein said irradiated lead silicate glass material comprises a lead silicate glass grating.

* * * * *